United States Patent [19]

Spears

[11] Patent Number: 5,018,298

[45] Date of Patent: May 28, 1991

[54] HOLDER FOR PRE-RIGGED FISHING LEADERS

[76] Inventor: Susan T. Spears, 885 Lake Forest Dr., Lake Oswego, Oreg. 97034

[21] Appl. No.: 467,957

[22] Filed: Jan. 22, 1990

Related U.S. Application Data

[63] Continuation-in-part of Ser. No. 394,921, Aug. 7, 1989, abandoned.

[51] Int. Cl.⁵ ............................................. A01K 97/00
[52] U.S. Cl. ...................................................... 43/57.2
[58] Field of Search ......................................... 43/57.2

[56] References Cited

U.S. PATENT DOCUMENTS

| | | | |
|---|---|---|---|
| 2,080,794 | 5/1937 | Squassoni | 43/31 |
| 2,667,010 | 1/1954 | Anderson | 43/57.2 |
| 2,670,563 | 3/1954 | Anderson | 43/57.2 |
| 2,730,833 | 1/1956 | Newell | 43/57.5 |
| 2,749,654 | 6/1956 | Harris | 43/57.2 |
| 2,760,296 | 8/1956 | Faul | 43/57.5 |
| 3,490,168 | 1/1970 | Posavec | 43/57.5 |
| 3,564,755 | 2/1971 | Lindgren, Sr. | 43/57.5 |
| 3,890,737 | 6/1975 | Jones | 43/57.2 |
| 4,791,752 | 12/1988 | Van Kampen | 43/57.2 |

*Primary Examiner*—Kurt Rowan
*Attorney, Agent, or Firm*—Eugene M. Eckelman

[57] ABSTRACT

A body member has a plurality of pegs projecting integrally in spaced relation and in a line. These pegs form individual hooking pegs for swivels of elongated fishing leaders and also form wrapping areas therebetween for leaders which are wrapped in a direction parallel with the pegs. The body member has a puncturable surface whereby the fish hook end of the leader can be anchored by sticking the point of the fish hook into the body member. In one embodiment, the body member is rectangular and is formed of two halves secured adhesively together along the line of the pegs and holding the pegs in projecting integral relation. In another embodiment, the body member with the pegs is in the form of a drum mounted on the end walls of a box-like frame and having a crank handle on one end.

1 Claim, 2 Drawing Sheets

HOLDER FOR PRE-RIGGED FISHING LEADERS

REFERENCE TO PRIOR APPLICATIONS

This application is a continuation in part of application Ser. No. 07/394,921, filed Aug. 7, 1989, now abandoned.

BACKGROUND OF THE INVENTION

This invention relates to new and useful improvements in holders for pre-rigged fishing leaders.

Fishermen frequently like to pre-rig a supply of leaders so that new leaders can be installed quickly when the old ones are snagged or otherwise lost. A pre-rigged leader is from two to six feet long or longer. Such supply of pre-rigged leaders are difficult to store in the tackle box or fishing vest since they become tangled or snagged. Prior devices have been proposed for storing fishing leaders or lines to alleviate the tangling and snagging problems. One such device is shown in U.S. Pat. No. 2,791,863 wherein a wooden body member with slots is arranged to receive a line in wrapped relation and the hook is embedded in the wood. One disadvantage of such device is that the wood dulls the hook and another disadvantage is that it is not designed to hold pre-rigged fishing leaders. As stated, such pre-rigged leaders are quite long and would not fit on this prior device or in other devices such as shown in U.S. Pat. Nos. 2,080,794, 2,730,833, 2,749,654, 2,760,296, 3,490,168, and 3,564,755.

SUMMARY OF THE INVENTION

According to the present invention and forming a primary objective thereof, a holder for pre-rigged fishing leaders plus the swivel is provided which amounts to an improvement in the art in view of its simplicity in structure and its ease of use.

Another object of the invention is to provide a holder of the type described that holds elongated, pre-rigged fishing leaders in place with the sharp portion of the hooks embedded in a soft protective and undamaging surface so as to prevent dulling of the hooks.

Another object of the invention is to provide a holder of the type described that is inexpensive to manufacture.

In carrying out these objectives, a first embodiment of the holder comprises a flat rigid rectangular body member having a plurality of pegs projecting integrally in spaced relation and in a line along one of its edges. These pegs form individual hooking means for a swivel on the leader and also form wrapping areas therebetween for elongated fishing leaders which can be wrapped around the body member several times in a direction parallel with the projecting direction of the pegs. This embodiment is designed to hold leaders eighteen inches to three feet in length with single hooks attached. The body member has a surface of a puncturable material whereby the point of the fish hook is embedded in the body member to conceal it without dulling it and also to hold the leader tightly in place. In a preferred construction of this embodiment, the body member is formed of two halves secured adhesively together along the line of the pegs whereby to form a simplified structure for holding the pegs integrally in projecting relation. In a second embodiment, the holder includes a box-like frame that supports a rotatable drum therein also having a plurality of pegs projecting from its surface. The drum has a surface of a puncturable material for connection thereto of the hook of elongated leaders that have been wrapped around the drum after hooking the swivel on a peg. This embodiment is especially designed for leaders three to six feet long with treble hooks attached.

The invention will be better understood and additional objects and advantages will become apparent from the following description taken in connection with the accompanying drawings.

DETAILED DESCRIPTION OF A PREFERRED EMBODIMENT

Figure 3:
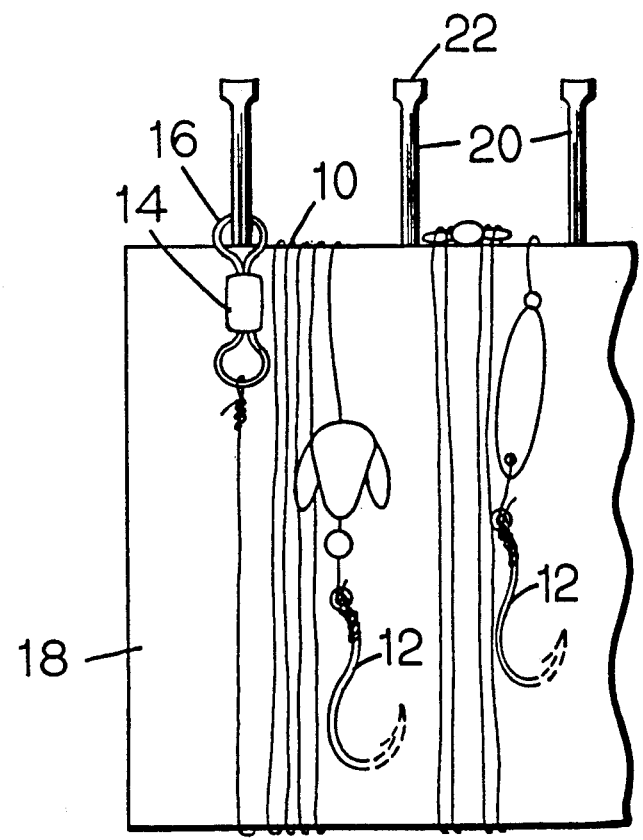
FIG. 3 is a fragmentary elevational view showing the present holder with fishing hooks, leaders, and swivels stored thereon.

With particular reference to the drawings and first to FIG. 3, the numeral 10 designates a conventional leader having the usual lure and/or hook end 12 and a swivel 14 at the other end with an end eye 16 which in use connects to a pole line. The present invention is intended for use with the type of leader shown, namely, the usual long leader wherein the hook is spaced from the end of the pole line two or more feet.

Figure 1:
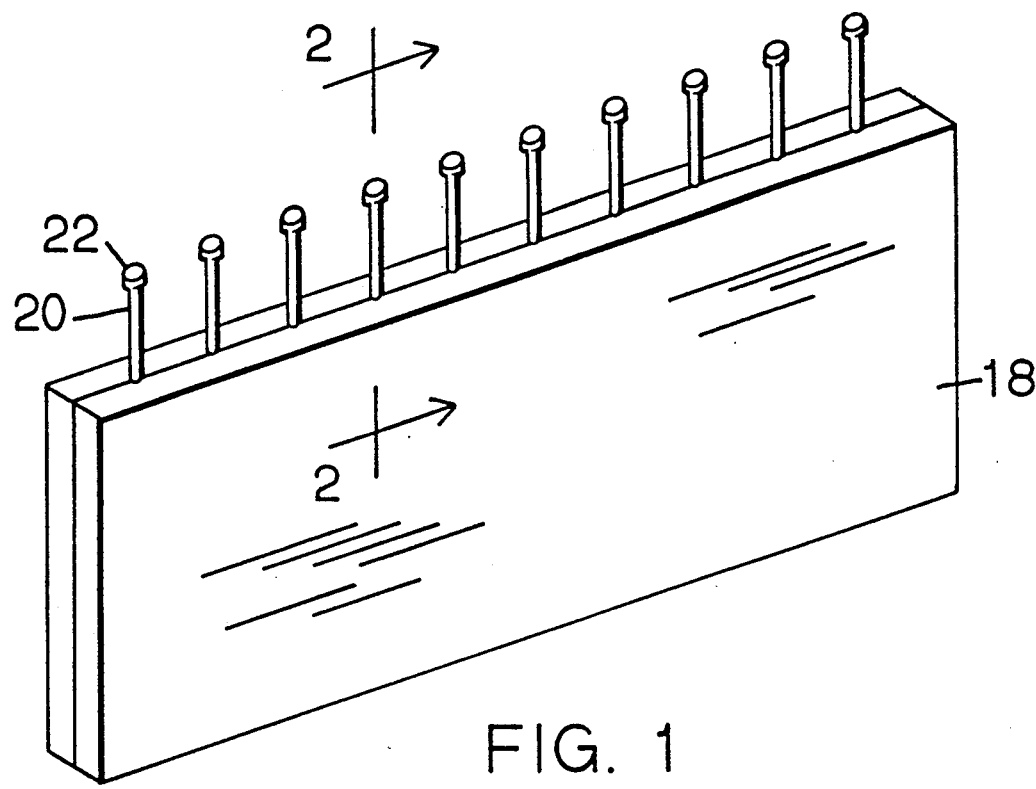
FIG. 1 is a perspective view of a first form of the holder for pre-rigged fishing leaders embodying features of the present invention.
Figure 2:
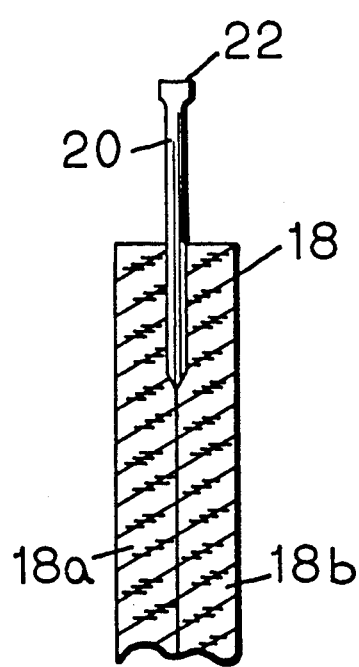
FIG. 2 is an enlarged fragmentary sectional view taken on the line 2—2 of FIG. 1.

A first form of the invention, FIGS. 1-3, comprises a flat, rigid, rectangular buoyant body member 18 having a plurality of pegs 20 projecting from one edge thereof, preferably a longitudinal edge. The pegs 20 are selectively spaced apart in alignment whereby a leader 10 can be wrapped around the body member 18 between the pegs in a direction parallel with the pegs. In a preferred structure, the pegs 20 have heads 22 which resist accidental displacement of the eye portion 16 of a swivel 14 from a peg when mounted thereon. The pegs if constructed of metal are galvanized so that they will not rust.

The body member 18 is constructed of or covered with a puncturable material such as cork or a cork-like material such as rubberized styrafoam. Such a material provides a good grip on the leader when it is wrapped around the body member and also allows the pointed end of the fish hook to be embedded therein for anchoring the fish hook end of the leader and for concealing this sharp end.

For installing a leader on the holder, the eye 16 of the swivel is hooked on a peg 20, as shown on the left side of FIG. 3, and the leader then wrapped tightly around the body member. The hook is stuck in the body member as shown in FIG. 3 whereby both ends of the leader are firmly anchored in place and the leader is confined in wrapped relation between a pair of the pegs.

In the event that the eye 16 of the swivel is too small to hook on a peg 20, it is merely laid on the edge of the body member between a pair of the pegs, as shown on the right side of FIG. 3, and the leader wrapped over it or over the first wrapping of the line to hold it firmly on such edge. Similar to the other hook shown, the sharp end thereof is embedded in the body member.

In a preferred construction of the first embodiment, and with reference to FIG. 2, the body member 18 is formed of two halves 18a and 18b, and these halves are adhesively secured together for clamping and adhesively securing the pegs in place.

Figure 4:
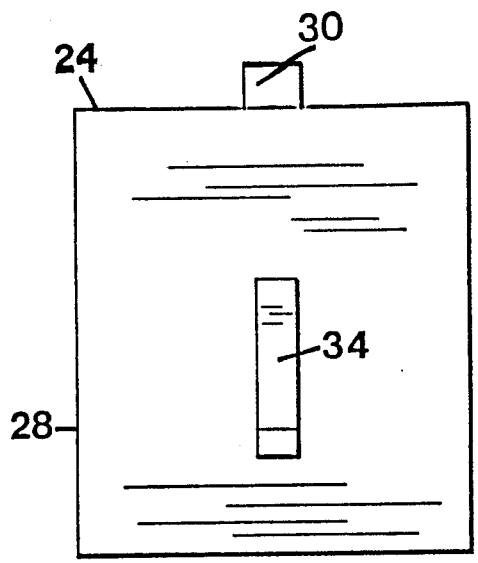
FIG. 4 is an end view of another form of the holder.
Figure 5:
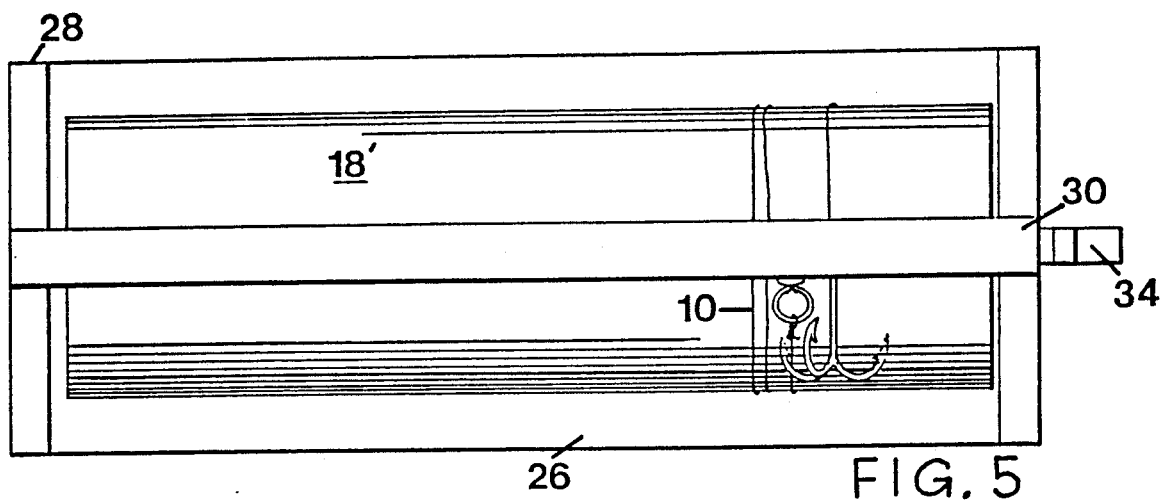
FIG. 5 is a plan view of the holder of FIG. 4.
Figure 6:
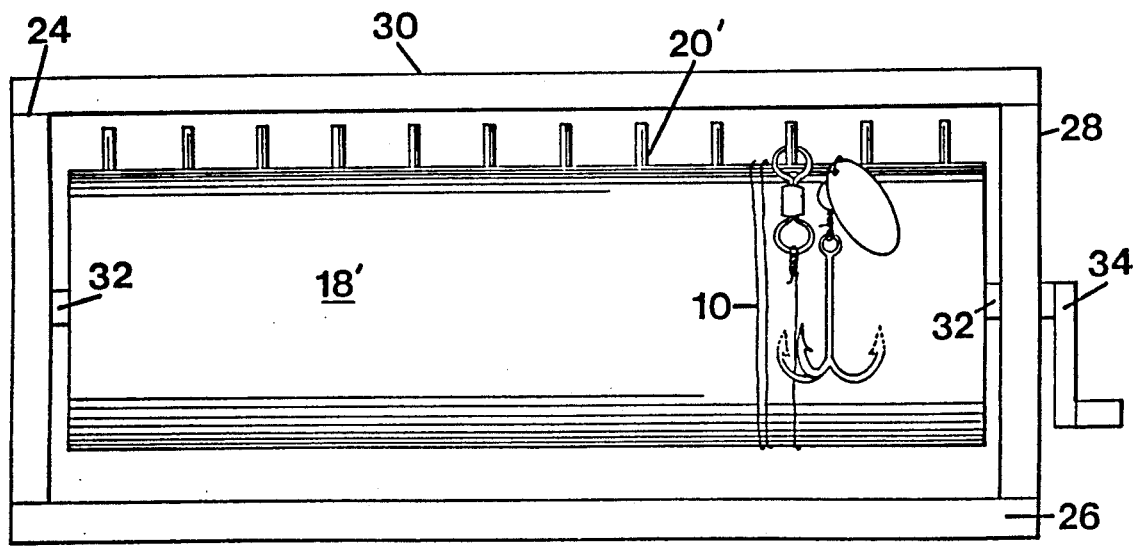
FIG. 6 is a side elevational view.

With reference to FIGS. 4-6 the second embodiment has a drum 18' as the body member around which elongated leaders 10 are wrapped. As in the first embodiment, the drum has a plurality of evenly spaced and aligned pegs 20'. These pegs may have heads as in the first embodiment if desired. The drum is constructed of or covered with a puncturable material such as cork or rubberized styrafoam and is supported in a box-like frame 24 having a bottom wall 26, end walls 28, and a top longitudinal central bar 30 that serves as a handle as well as a protective member at the upper end. The drum 18' is mounted on end spindles 32 having journaled supported in the end walls. One of these spindles is integral the drum and has a crank handle 34 for manually turning the drum. As in the FIG. 1 embodiment, the eye 16 of a leader is hooked on a peg 20' for installing the leader on the drum, and after turning the drum sufficiently to wind the leader through its full length, the hook is embedded in the puncturable surface. The embodiment of FIGS. 4-6 is especially adaptable for holding leaders with treble hooks.

The holder is extremely simplified in structure and inexpensive to manufacture. The spaced pegs 20 and 20' positively hold long leaders in separated relation and prevent tangling. Also, anchored on of the one end on a peg, or the wrapped clamping of the swivel under the leader, and embedding the hook in the body member on the other end provides a positive mount of the leader on the body member. The flat rectangular body member of FIGS. 1-3 conveniently fits in a tackle box or fishing vest, and the holder of FIGS. 4-6 conveniently fits in underseat compartments or the like of boats. In each embodiment, the holder supports full length leaders which are quickly mounted on the holder and removed for convenience.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A holder for elongated pre-rigged fishing leaders of the type having a fish hook at one end and a pole line connecting eye at its other end, said holder comprising:
    a box-like frame having bottom and end walls and an elongated top longitudinal bar between said end walls serving as a handle,
    a drum mounted for rotation between said end walls,
    and a plurality of pegs projecting integrally from said drum in spaced relation,
    said pegs forming individual hooking pegs for the pole line connecting eye of a fishing leader and also forming wrapping areas therebetween for fishing leaders wrapped around said drum in a direction parallel with the projecting direction of said pegs,
    said drum having a puncturable surface whereby a fish hook end of a leader can be anchored on said drum by sticking the point of the fish hook into said surface.

* * * * *